US012617028B2

(12) United States Patent
Revelli

(10) Patent No.: US 12,617,028 B2
(45) Date of Patent: May 5, 2026

(54) POWER TOOL AND CONTROL MODULE THEREFOR

(71) Applicant: MAKITA CORPORATION, Anjo (JP)

(72) Inventor: Mario Revelli, Anjo (JP)

(73) Assignee: MAKITA CORPORATION, Anjo (JP)

( * ) Notice: Subject to any disclaimer, the term of this patent is extended or adjusted under 35 U.S.C. 154(b) by 0 days.

(21) Appl. No.: 19/015,948

(22) Filed: Jan. 10, 2025

(65) Prior Publication Data

US 2025/0256337 A1 Aug. 14, 2025

(30) Foreign Application Priority Data

Feb. 14, 2024 (JP) ................................. 2024-020156

(51) Int. Cl.
| | |
|---|---|
| *B23B 45/02* | (2006.01) |
| *B25F 5/02* | (2006.01) |
| *H02K 7/14* | (2006.01) |
| *H02K 11/33* | (2016.01) |

(52) U.S. Cl.
CPC ................ *B23B 45/02* (2013.01); *B25F 5/02* (2013.01); *H02K 7/145* (2013.01); *H02K 11/33* (2016.01); *B23B 2270/32* (2013.01)

(58) Field of Classification Search
CPC ..... B23B 45/02; B23B 2270/32; H02K 11/33; H02K 7/145; B25F 5/02
See application file for complete search history.

(56) References Cited

U.S. PATENT DOCUMENTS

| | | | | |
|---|---|---|---|---|
| 4,572,997 | A * | 2/1986 | Yamanobe ............. | H01H 9/061 |
| | | | | 200/522 |
| 5,835,351 | A * | 11/1998 | Ulanski .................... | H01H 9/06 |
| | | | | 200/332.2 |
| 10,541,588 | B2 * | 1/2020 | Wachter .................... | B25F 5/00 |
| 2006/0009053 | A1 * | 1/2006 | Broghammer ......... | H05K 3/303 |
| | | | | 439/83 |
| 2012/0293099 | A1 * | 11/2012 | Velderman ........... | H01R 12/718 |
| | | | | 318/400.18 |
| 2013/0140167 | A1 * | 6/2013 | Kobayashi ............. | H01H 9/061 |
| | | | | 200/522 |
| 2013/0184730 | A1 * | 7/2013 | Beardsley .............. | A61B 90/70 |
| | | | | 606/174 |

(Continued)

FOREIGN PATENT DOCUMENTS

EP 2946886 B1 2/2017

*Primary Examiner* — Lucas E. A. Palmer

(74) *Attorney, Agent, or Firm* — J-TEK LAW PLLC; Jeffrey D. Tekanic; Scott T. Wakeman

(57) ABSTRACT

A control module (10) for a power tool includes a box-shaped case (60), one side of which is open, and a circuit board (50) housed in the case. A microcomputer (51) and FETs (52) configured to control a brushless motor (1c) of the power tool are mounted on the circuit board. Movable switches (30) are mechanically linked to movement of a trigger (20) and are electrically connected to the circuit board. A cover (70) partially covers the opening of the case such that a portion of the circuit board and the movable switches are covered. Bonded parts (14) weld or otherwise materially bond the cover and the case to form an enclosed space (13), which encloses the movable switches.

20 Claims, 11 Drawing Sheets

(56)                    References Cited

U.S. PATENT DOCUMENTS

| | | | | |
|---|---|---|---|---|
| 2014/0361645 | A1* | 12/2014 | Beyerl | B25F 5/008 |
| | | | | 310/50 |
| 2015/0196363 | A1* | 7/2015 | Aman | B25F 5/02 |
| | | | | 53/425 |
| 2015/0279592 | A1 | 10/2015 | Ekstrom et al. | |
| 2015/0280515 | A1 | 10/2015 | Ekstrom et al. | |
| 2015/0280516 | A1 | 10/2015 | Ekstrom et al. | |
| 2015/0280517 | A1 | 10/2015 | Ekstrom et al. | |
| 2015/0282337 | A1* | 10/2015 | Ekstrom | H01H 9/061 |
| | | | | 173/170 |
| 2016/0095585 | A1* | 4/2016 | Zergiebel | A61B 17/07207 |
| | | | | 606/1 |
| 2016/0106401 | A1* | 4/2016 | Beardsley | A61B 17/10 |
| | | | | 606/1 |
| 2016/0218589 | A1* | 7/2016 | Purohit | H02K 9/227 |
| 2016/0310134 | A1* | 10/2016 | Contini | A61B 17/0686 |
| 2016/0318165 | A1* | 11/2016 | Thorson | B25B 23/141 |
| 2016/0365202 | A1* | 12/2016 | Koyama | H01H 13/08 |
| 2018/0342928 | A1* | 11/2018 | Ekstrom | B25F 5/008 |
| 2019/0283222 | A1* | 9/2019 | Thorson | B25B 23/147 |
| 2020/0243271 | A1* | 7/2020 | Koyama | H01H 13/64 |

* cited by examiner

POWER TOOL AND CONTROL MODULE THEREFOR

CROSS-REFERENCE

The present application claims priority to Japanese patent application serial number 2024-020156 filed on Feb. 14, 2024, the contents of which are hereby fully incorporated by reference.

TECHNICAL FIELD

The present invention relates to a power tool and to a control module for a power tool. The control module integrally comprises a circuit board and trigger, which are, for example, associated with the control of a power tool motor.

BACKGROUND ART

A power tool disclosed in European Patent No. 2946886 has a brushless motor and a control module. The control module has a case that is open at the top and a circuit board that is housed in the case. FETs (field effect transistors), which are used to control the brushless motor, are provided on the circuit board. The control module further has a trigger and an actuator, which is movable in conjunction with the operation (movement) of the trigger. The actuator is connected to the circuit board and is covered by a cover. The cover is connected to the case by snap fitting. The actuator is provided in the enclosed space formed by the cover and the case, to protect the actuator.

SUMMARY OF THE INVENTION

However, snap fit connection may leave a gap between the cover and the case, such that the enclosed space may not be adequately dustproof or waterproof. Therefore, poor conduction may eventually occur at the contacts due to corrosion or covering caused by dust or water that has entered the enclosed space. There is, therefore, a need for a control module that can adequately dustproof or waterproof the enclosed space formed by the cover and the case.

According to one aspect of the present disclosure, a control module for a power tool includes a box-shaped case, one side of which is open, and a circuit board housed in the case. A microcomputer and FETs (field effect transistors), which are used to control a brushless motor of the power tool, are mounted on the circuit board. A manipulatable member (e.g., a trigger) is movably coupled to (partially disposed in) the case. Movable switches, which are mechanically linked to the movement of the manipulatable member, are connected to the circuit board; i.e. the movable switches preferably move together with the manipulatable member. The cover is partially overlaid on the opening of the case. The cover covers a portion of the circuit board and covers the movable switches. The control module further includes bonded parts, which weld or bond the cover and the case. The bonded parts form an enclosed space, which encloses the movable switches.

With regard to the bonded parts, at least portions of the cover and the case are melted so as to be welded to each other, or a bonding agent is used to bond the cover and the case to each other. Therefore, gaps between the cover and the case are filled by the bonded parts. Accordingly, enclosed space is formed between the cover and the case. The enclosed space is more dustproof and waterproof than, for example, an enclosed space in which the cover and the case are connected to each other by snap fitting. The movable switches are protected by the enclosed space, more particularly by the case, cover and bonded parts. Thus, poor conduction caused by the ingress of dust or water is unlikely to occur in the movable switches.

BRIEF DESCRIPTION OF THE DRAWINGS

FIG. 6 is an exploded perspective view in which FIG. 5 is seen from the left side.

DETAILED DESCRIPTION OF THE INVENTION

Figure 1:
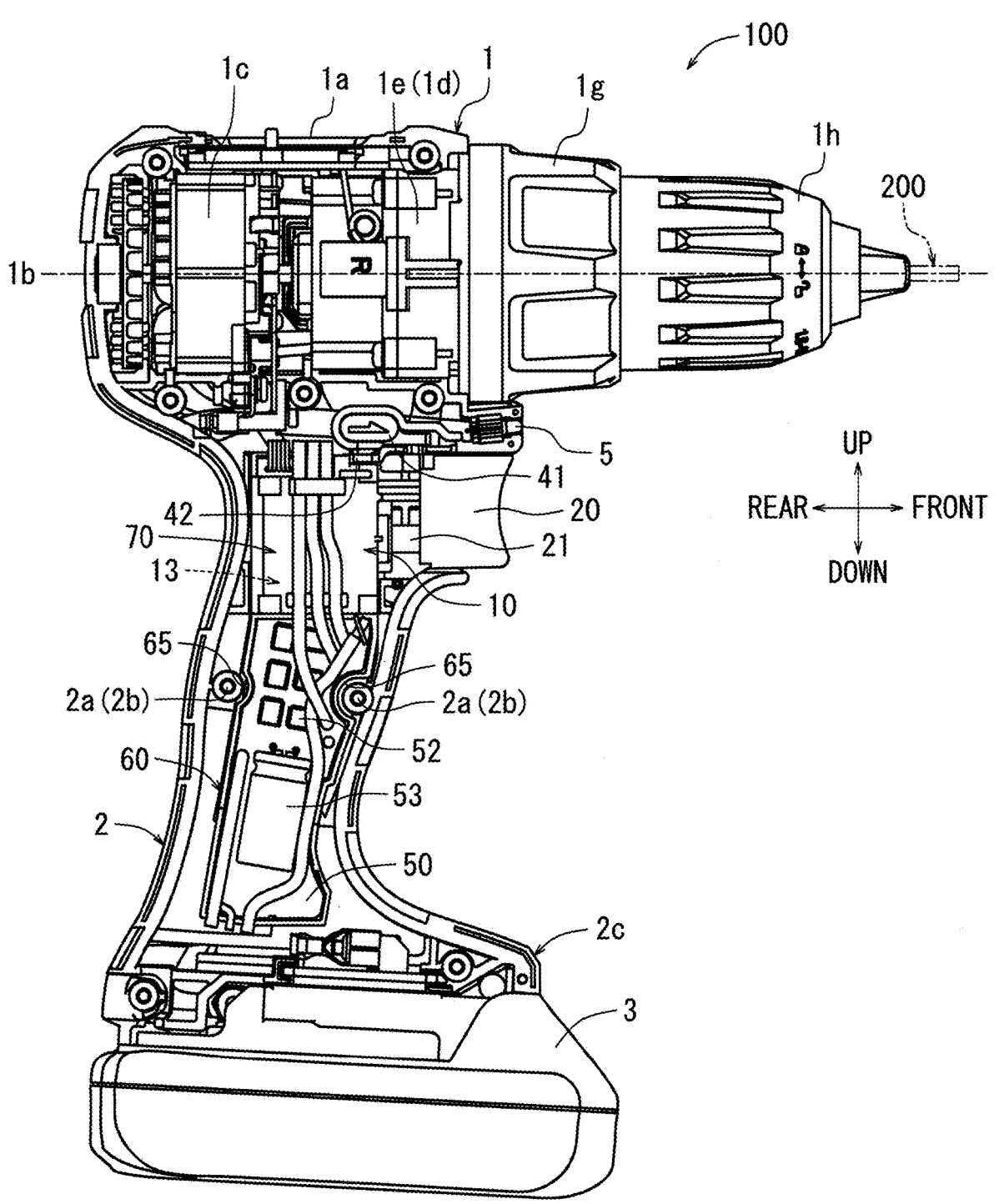
FIG. 1 is a right side view of a power tool according to the present disclosure, with the right side housing removed.

According to another aspect of the present disclosure, a microcomputer (microprocessor, memory, etc.) and FETs are provided on the circuit board at positions clear (outside) of the enclosed space. Consequently, when the microcomputer and the FETs generate heat during operation of the power tool, the microcomputer and the FETs can effectively dissipate the heat, because the microcomputer and FETs are not disposed in the enclosed space of the control module.

According to another aspect of the present disclosure, the operation (starting, energization) and stopping of the brushless motor are switched by the movement of a movable switch, which is linked to the manipulatable member. Thus, the operation and stopping of the brushless motor are switched by manipulating (e.g., pulling, squeezing) the manipulatable member.

According to another aspect of the present disclosure, the movable switches include a power switch and a variable speed switch. The power switch is configured to electrically connect and disconnect the brushless motor and the battery. The variable speed switch is configured to control the output (in particular, rotational speed of a rotor) of the brushless motor according (proportional) to the amount of movement of the manipulatable member. Thus, the power switch and the variable speed switch are each controllable by manipulating the manipulatable member. The movable switches may further include a control switch that is configured to control operations in the microcomputer. The microcomputer may, for example, recognize the input of the control switch and light a power tool lamp. The lamp can, therefore, be reliably lit in response to manipulation the manipulatable member.

According to another aspect of the present disclosure, the case has a case bottom wall and case peripheral walls extending upright (at least substantially perpendicular) from peripheral edges of the case bottom wall. The cover has a cover bottom wall and cover peripheral walls extending upright (at least substantially perpendicular) from peripheral edges of the cover bottom wall. The bonded parts weld or bond, to each other, case facing-surfaces of the case peripheral walls and cover facing-surfaces of the cover peripheral walls, which face each other in the directions of extension. Thus, the mutually-facing surfaces of the case peripheral walls and the cover peripheral walls are welded or bonded together.

According to another aspect of the present disclosure, the cover has guide pieces, which extend toward the case beyond the cover facing-surfaces of the cover peripheral walls and extend so as to pass between the case peripheral walls and side surfaces of the circuit board. The guide pieces fit between the circuit board and the case peripheral walls. Thus, the cover is held stably with respect to the circuit board and the case by the guide pieces. Furthermore, the bonded parts may weld or bond the ends of the guide pieces to the case.

According to another aspect of the present disclosure, the cover is provided (disposed, overlaid) at one end side of the case; i.e. the cover covers (encloses) a first end portion of the case in the elongation direction of the case. A wall part of the cover peripheral walls, which is located at an intermediate position of the case in the elongation direction of the case, extends into the interior of the case. This wall part of the cover and the circuit board are bonded (adhered) by a sealed part, e.g., an adhesive. A second end portion of the case that is not covered by the cover is covered by a resin molding; i.e. components disposed (mounted) in the second end portion of the case are potted (encapsulated) with a solid compound, such as a thermosetting plastic, a silicone rubber gel or an epoxy resin. Thus, electronic components on the other end side (disposed in the second end portion) of the case are protected (shielded) from dust or water by the resin molding. The resin molding is prevented (blocked) from entering the enclosed space by the cover peripheral walls and the sealed part. Thus, contact failure in the switches caused by ingress of the resin molding into the enclosed space can be avoided.

According to another aspect of the present disclosure, the manipulatable member is a trigger, which is manipulated by pulling. The trigger has a rod, which passes between the case and the cover. The rod (and thus the trigger) is physically connected to the movable switches in the enclosed space and is movable in an axial direction of the rod. Thus, after assembling the case and the cover, the rod is interposed between the case and the cover. The rod slides in the axial direction, relative to the case and the cover.

According to another aspect of the present disclosure, anti-dust grease is provided between the rod and the case, and between the rod and the cover. This anti-dust grease blocks dust from penetrating into the enclosed space through the annular gap between the cover, case and rod. In addition, a change switch (rotation switching device) is provided in the enclosed space, which when actuated changes the direction of rotation of the rotor of the brushless motor. A change bracket (mechanical connector) passes between the case and the cover and is physically connected to the change switch.

Anti-dust grease is provided between the change bracket and the case, as well as between the change bracket and the cover.

According to another aspect of the present disclosure, the control module includes a spring that biases the manipulatable member. The spring is disposed in the enclosed space. Thus, difficulties in deforming the spring resulting from dust or water are curtailed because the spring is also disposed in the enclosed space.

According to another aspect of the present disclosure, the movable switches are disposed adjacent to one end side of the circuit board. The microcomputer is mounted on the other end side of the circuit board so as to be farther away from the movable switches than the FETs; i.e. the FETs are disposed between the movable switches and the microcomputer in the elongation direction of the case.

According to another aspect of the present disclosure, the case has case protrusions that project (inward) toward the circuit board so as to be clear of (avoid) screws provided in the main body of the power tool. The circuit board has board recesses into which the case protrusions are respectively inserted in a form fit manner. The circuit board is positioned relative to the case by the board recesses. Thus, the case protrusions of the case perform both the function of avoiding (clearing) the screws and the function of positioning the circuit board within the case.

According to another aspect of the present disclosure, the microcomputer (which preferably serves as a power tool controller) and a capacitor, which temporarily stores charge to be supplied to the motor, are provided on the circuit board. The capacitor is disposed at a position outside of the enclosed space. The capacitor is a relatively large component. Therefore, because the capacitor is disposed outside of the enclosed space, it is possible to avoid having to increase the size of the cover due to the capacitor. The capacitor has a capacitance of, for example, 100 μF to 1200 μF, preferably 500 μF to 1200 μF, and more preferably 1000 μF to 1200 μF.

According to another aspect of the present disclosure, the FETs are provided outside of the cover (i.e. outside of the enclosed space) and on the surface of the circuit board, which faces the opening of the case. The FETs are covered (potted, encapsulated) by the resin molding. Therefore, because they are outside of the cover (enclosed space), it is easy for the FETs to dissipate heat. Furthermore, the FETs are protected (shielded) from dust or water by the resin molding.

According to another aspect of the present disclosure, the FETs include first FETs and second FETs that are provided along the circuit board, in a state such that an elongation direction of the second FETs are inclined by 80 to 100 degrees relative to an elongation direction of the first FETs. A heat sink is preferably overlaid so as to span (cover and contact) the first FETs and the second FETs. In such an embodiment, the heat sink can more efficiently dissipate heat from the first FETs and the second FETs.

According to another aspect of the present disclosure, the power tool has a grip extending from the tool body. The control module is disposed within the grip. The cover and the manipulatable member are disposed at the first end portion of the control module. Because the grip and the control module are both elongated structures, the control module has a rational component arrangement corresponding to the grip.

According to another aspect of the present disclosure, the power tool further includes a sensor board having at least one rotational sensor, which detects the rotational speed of the brushless motor. A first lead (wire(s)) extends from the sensor board to a position on the circuit board outside of the enclosed space. Thus, one end of the first lead can easily be provided on the circuit board.

According to another aspect of the present disclosure, the power tool further includes a lamp. A second lead (wire(s)) extends from the lamp to a position on the circuit board outside of the enclosed space. Thus, one end of the second lead can easily be provided on the circuit board.

Next, a first exemplary embodiment of the present teachings (a power tool 100) will be described based on FIGS. 1 to 10. As shown in FIG. 1, the exemplary power tool 100 is a driver drill, which rotationally drives a removably mounted tool accessory 200. The user grips the power tool 100 with one hand and stands on the left side in FIG. 1. In the following description, the side closer to the user is defined as the rear direction (user side), and the side farther from the user is defined as the front direction. The up-down and left-right directions are defined based on the user holding the driver drill such that the tool accessory 200 is above a battery pack 3.

As shown in FIG. 1, the power tool 100 includes a tool body 1. The tool body 1 has a substantially cylindrical housing 1a. The housing 1a extends along a prescribed drive axis 1b. The housing 1a houses a brushless motor 1c as a motive drive source and a drive mechanism 1d that drives the tool accessory 200 using the power of the brushless motor 1c. A mode changing ring (adjusting ring) 1g that changes the action mode of the power tool 100 and a chuck 1h, in which the tool accessory 200 is detachably attachable, are provided at the front end of the housing 1a. The mode changing ring 1g is provided so as to be rotatable about the drive axis 1b.

The power tool 100 has two action modes, namely: a drilling mode and a driving mode (also known as a screw-driving mode (rotation with clutch)). The drilling mode is an action mode in which drilling work is performed on a workpiece by rotationally driving a drill bit, which is one example of the tool accessory 200 according to the present teachings. The driving mode is an action mode in which fastening (driving, tightening) of screws, etc. is performed by rotationally driving a driver bit, which is another example of the tool accessory 200 according to the present teachings. The user can change the action mode of the power tool 100 by manually rotating the mode changing ring 1g about the drive axis 1b.

Figure 2:
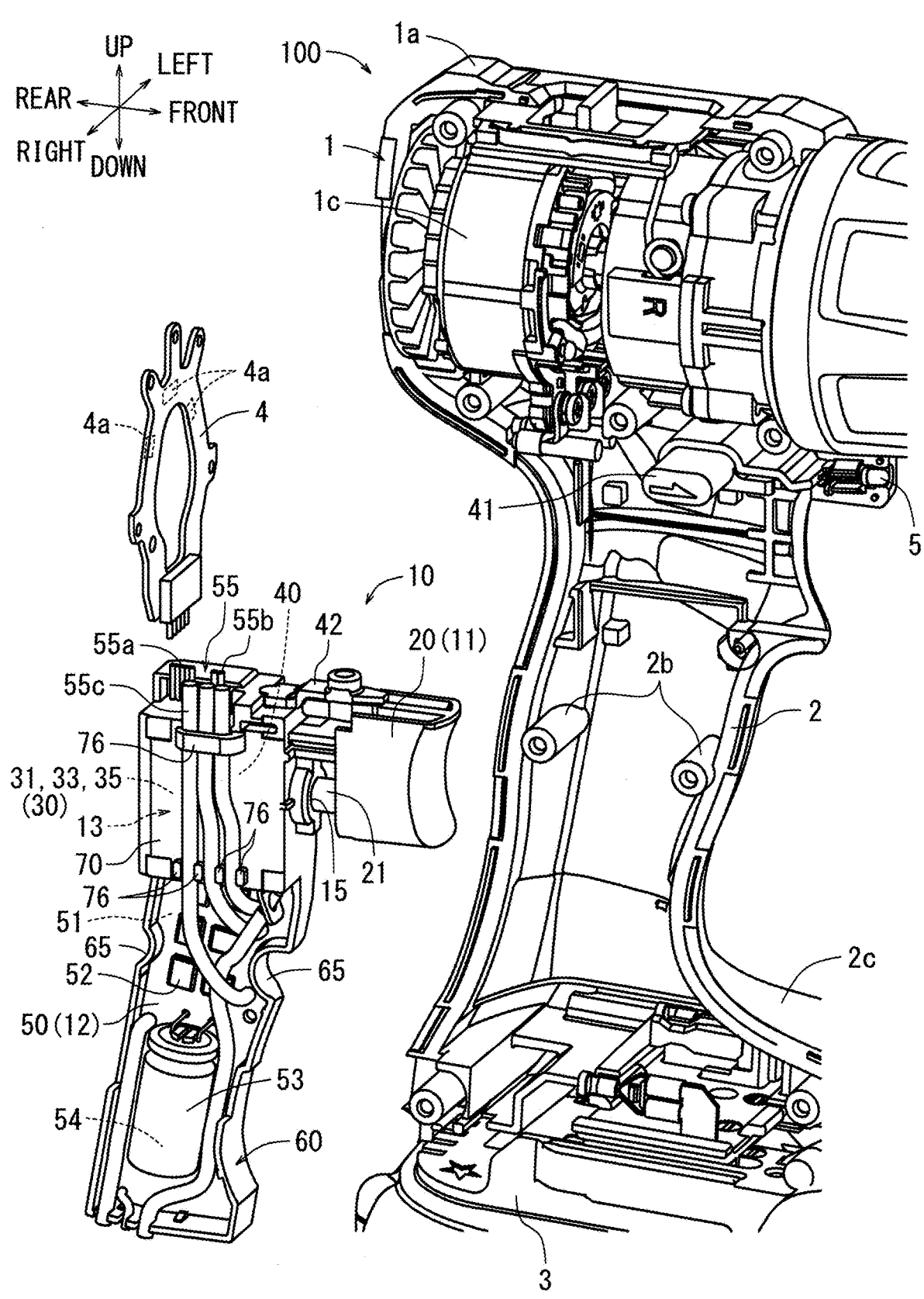
FIG. 2 is an exploded perspective view of the control module disassembled from the power tool.

As shown in FIGS. 1 and 2, a grip 2, which is configured to be gripped by the user, is provided on the lower part of the housing 1a. The grip 2 is substantially cylindrical. The grip 2 extends downward. The housing 1a and the grip 2 are halved structures that are divided in the left-right direction. The left and right parts of the grip 2 are assembled (joined) to each other by screws 2a. Cylindrical projections (bosses) 2b into which the screws 2a are screwed are provided in the central part, in the up-down direction, of the grip 2. A battery mounting part 2c is provided at the lower part of the grip 2. The battery 3 can be detachably mounted on the battery mounting part 2c. The battery 3 can be detached from the battery mounting part 2c and repeatedly used by recharging with a separately provided charger. The battery 3 functions as a power source that supplies power to the brushless motor 1c. The battery 3 can be attached to, and detached from, the battery mounting part 2c by sliding in the front-rear direction. More specifically, the battery 3 is mounted on the battery mounting part 2c by sliding rearward (mounting direction) with respect to the battery mounting part 2c. The battery 3 is removed by sliding frontward (removing direction) with respect to the battery mounting part 2c. The battery 3 can be attached and detached substantially parallel to the direction of movement of the trigger 20, which will be described hereafter.

As shown in FIG. 1, the brushless motor 1c is energized upon receiving a signal from a control module 10, which will be described hereafter, to rotate a rotor. The rotor of brushless motor 1c rotates about the drive axis 1b. The rotational output of the brushless motor 1c is transmitted to a drive mechanism 1d. The drive mechanism 1d includes a reduction gear train (speed reducing mechanism) 1e operably coupled to the rotor of the brushless motor 1c, a spindle, which is not shown, and the chuck 1h. The reduction gear train 1e increases the torque that was output from the brushless motor 1c, and then outputs the increased torque to the spindle. The spindle is thereby rotationally driven about the drive axis 1b. The chuck 1h is coupled so as to rotate integrally with the spindle. Therefore, as the spindle rotates, the chuck 1h rotates coaxially with the spindle. The tool accessory 200 mounted in the chuck 1h is thereby rotationally driven.

As shown in FIG. 2, the tool body 1 has a single sensor board 4. The sensor board 4 has sensors 4a, such as Hall ICs. The sensors 4a detect the rotational position of permanent magnets provided in the rotor of the brushless motor 1c. The sensor board 4 thereby detects the rotational speed of the brushless motor 1c. The sensor board 4 can, therefore, ascertain the operating state of the brushless motor 1c. In addition, the power tool 100 has a lamp 5 that lights during operation of the tool body 1. The lamp 5 is illuminated upon receiving a signal from a control module 10.

As shown in FIG. 2, the control module 10 is provided in the interior of the grip 2. The control module 10 is a module that integrally comprises a manipulatable part 11, which is manipulated by the user, and a control part 12, which controls the operation of the power tool 100 in response to manipulation of the manipulatable part 11 and the like. The control part 12 has a single circuit board 50. Control components such as a microcomputer 51 (e.g., one or more microprocessors, memory, storage, etc.), FETs 52 (preferably, power FETs), and a capacitor 53 are provided on the circuit board 50. In addition, a plurality of leads (wires) 55 are connected to the circuit board 50. Each of the leads 55 transmits or receives a signal or current between a control component and the brushless motor 1c, the lamp 5, or the like.

As shown in FIG. 2, the manipulatable part 11 includes a trigger 20, which the user manipulates by pulling with a finger, and movable switches 30, which are switched in conjunction with the pulling movement of the trigger 20. The movable switches 30 comprise a power switch 35, which electrically connects and disconnects the brushless motor 1c and the battery 3, a variable speed switch 33, which varies the rotational speed of the rotor of the brushless motor 1c according (proportional) to the amount by which the trigger 20 is pulled, and a control switch 31, which turns on and off the lamp 5 in accordance with signals from the microcomputer 51. The movable switches 30 are electrically connected to the circuit board 50 of the control part 12. The control part 12 can thereby ascertain the operating states of the movable switches 30.

Figure 8:
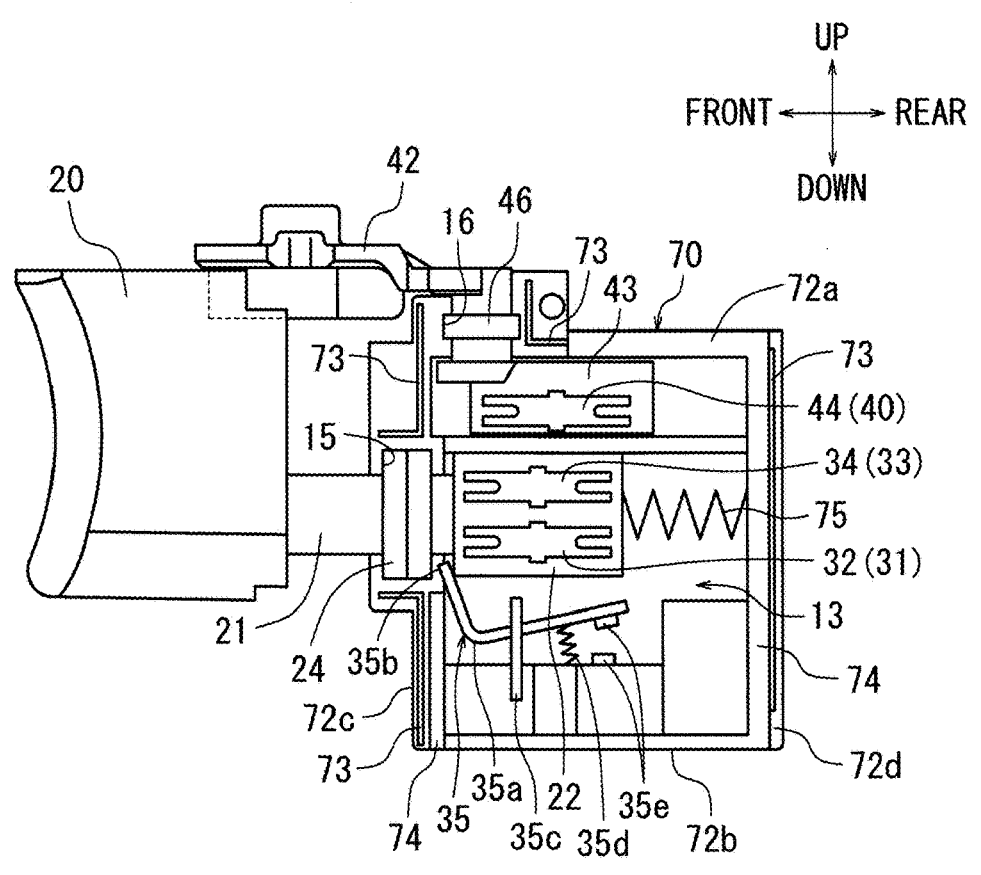
FIG. 8 is a view of the cover and the trigger, seen from the left side.

As shown in FIGS. 2 and 8, the manipulatable part 11 includes a change switch 40 that changes the direction of rotation of the rotor of the brushless motor 1c. The change switch 40 is physically coupled, via a change bracket (connector) 42, to a change button (reversing switch lever) 41, which projects from the left and right sides of the housing 1a. The user manipulates the change button (reversing switch lever) 41 by pushing with a finger in the left and right directions so that the change button (reversing switch lever) 41 slides relative to the housing 1*a*. The change switch 40 is switched in conjunction with such pushing manipulations of the change button 41. The change switch 40 is electrically connected to the circuit board 50 of the control part 12. The control part 12 can thereby ascertain the operating state of the change switch 40.

As shown in FIG. 2, the control module 10 includes a case 60, which integrally houses the manipulatable part 11 and the control part 12, and a cover 70, which is overlaid on the upper region of the case 60. The cover 70 is integrally (fixedly) assembled (joined, specifically, materially bonded) to the case 60 by performing ultrasonic welding along a seam between the cover 70 and the case 60. The cover 70 thereby covers the upper region of the case 60 without a gap between the cover 70 and the case 60. The control module 10 thereby has an enclosed space 13 formed by the case 60 and the cover 70, which have been materially bonded (e.g., welded) to each other without a gap. The movable switches 30 and the change switch 40 are disposed in the interior of this enclosed space 13. The case 60 and the cover 70 can thereby protect the movable switches 30 and the change switch 40. For example, the movable switches 30 and change switch 40 can be advantageously protected from dust and water, which are often present in the vicinity of the power tool 100.

Figure 3:
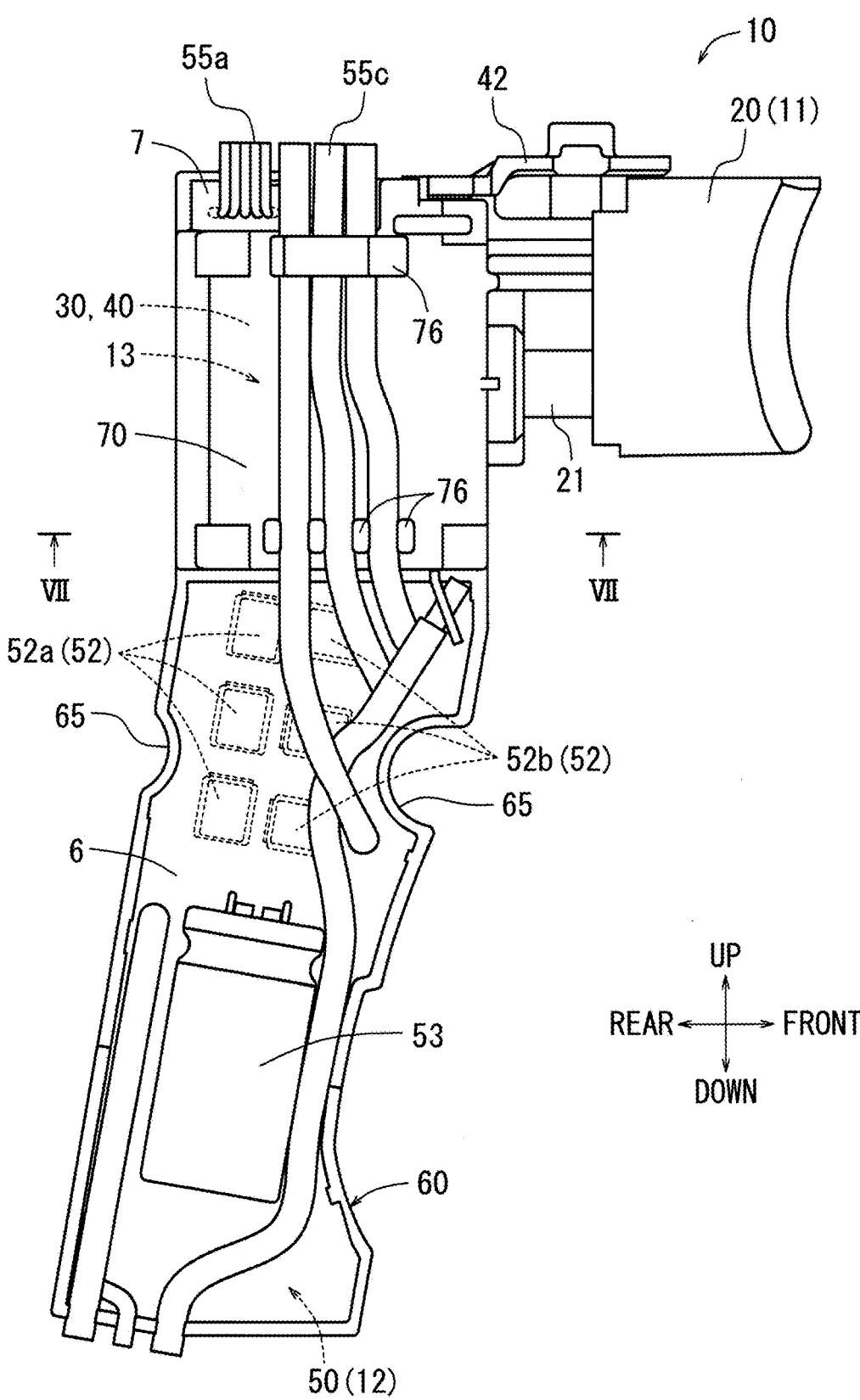
FIG. 3 is a right side view of the control module.

As shown in FIG. 3, a lower region of the case 60, which is not covered by the cover 70, is encapsulated (potted) by (with) a resin molding 6. The FETs 52 and a portion of the capacitor 53, which are housed in the lower region of the case 60, are therefore covered by the resin molding 6. The FETs 52 and the like can thereby be protected (shielded) from dust and water. This resin molding 6 does not penetrate into the interior of the enclosed space 13. It is, therefore, unlikely that contact failure will occur in the movable switches 30 and the change switch 40 due to the presence of resin molding 6 inside the enclosed space 13. It is noted that in the figures other than FIG. 3, illustration of the resin molding 6 is omitted for explanatory expediency. In addition, a bonding agent 7 is also applied at the upper end of the case 60, which is not covered by the cover 70. It is noted that the upper end may be encapsulated by the resin molding 6.

Figure 5:
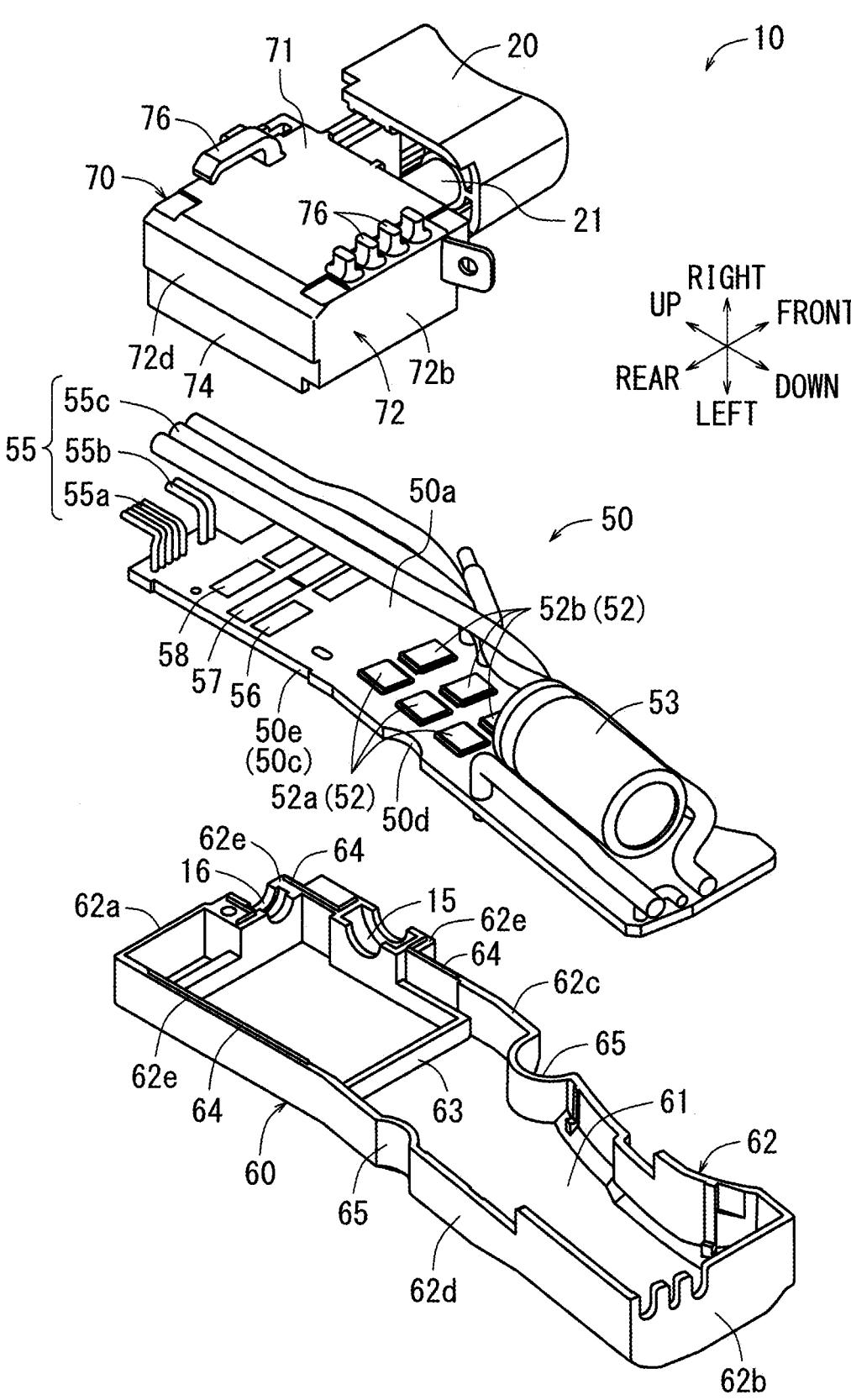
FIG. 5 is an exploded perspective view of the control module.

The structure of the control module 10 will now be described in greater detail below. As shown in FIG. 5, the case 60 of the control module 10 is a box-shaped member extending so as to be elongated in the up-down direction. The case 60 has a concave shape, one side of which is open. The case 60 is disposed so that the opening faces rightward. The case 60 has a case bottom wall 61, which forms a bottom surface at the bottom of the recess, and case peripheral walls 62, which respectively rise in the form of upright (perpendicular) walls from the peripheral edges of the case bottom wall 61. The case peripheral walls 62 extend in the rightward direction. In the upper region thereof, the case 60 has a rib 63 projecting in a substantially rectangular shape from the case bottom wall 61. The rib 63 forms an auxiliary support that serves to prevent the circuit board 50 from bending greatly.

The case peripheral walls 62 comprise a case upper wall 62*a*, a case lower wall 62*b*, a case front wall 62*c*, and a case rear wall 62*d*. In parts of the upright ends of the case upper wall 62*a*, the case front wall 62*c*, and the case rear wall 62*d*, welding protrusions 64 are formed on case facing-surfaces 62*e*, which face the cover 70 in the left-right direction. Each of the welding protrusions 64 is fused by ultrasonic welding. The case 60 has two case protrusions 65, which project inwardly in the front-rear direction at the centers, in the up-down direction, of the case front wall 62*c* and the case rear wall 62*d*. As shown in FIGS. 1 and 2, owing to the case protrusions 65, the case 60 can avoid interfering with the screws 2*a* and the projections 2*b* of the grip 2. The screws 2*a* and projections 2*b* are inserted into the case protrusions 65. The case 60 can thereby be positioned with respect to the grip 2.

Figure 6:
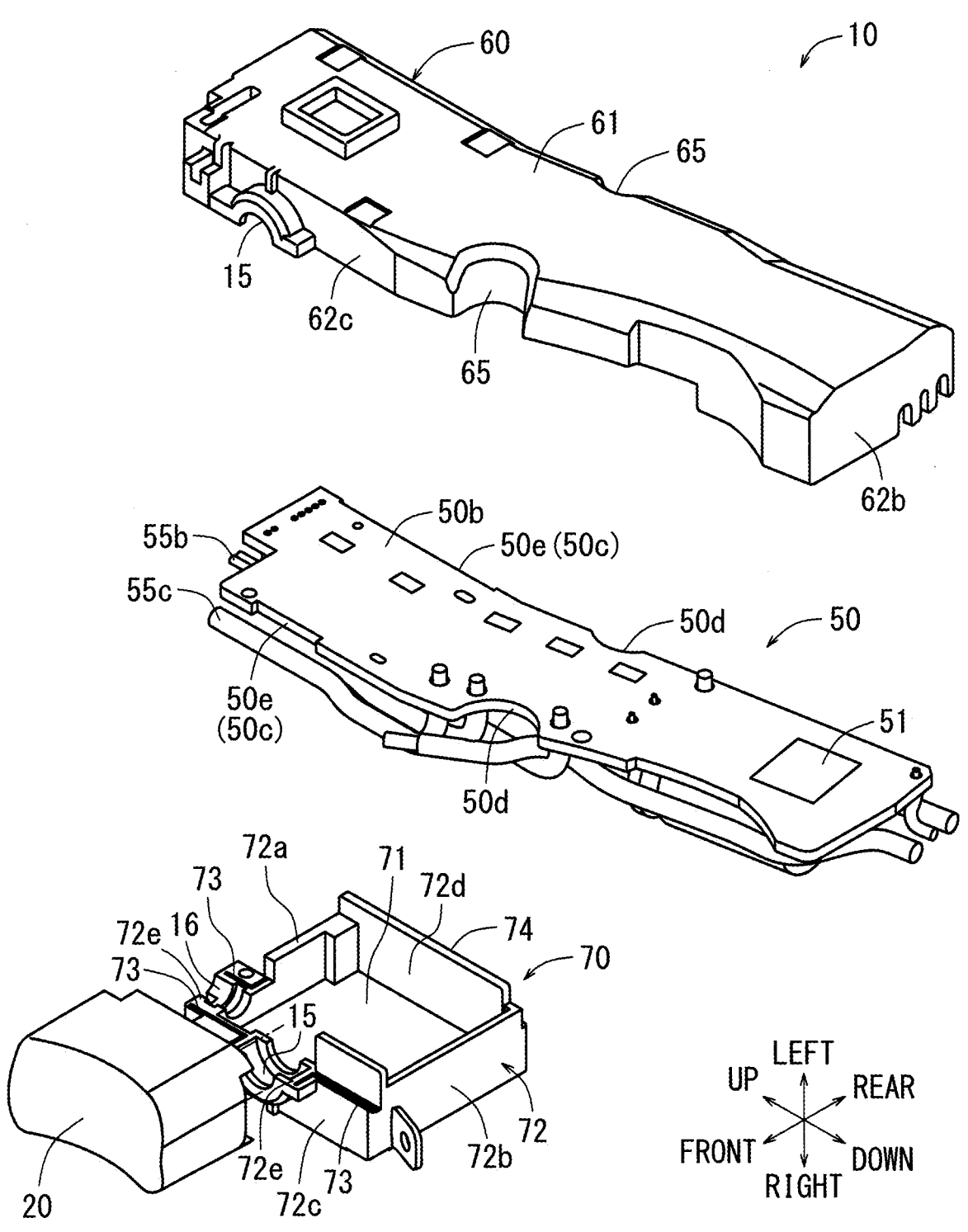

As shown in FIG. 6, the cover 70 of the control module 10 is a substantially rectangular member. The cover 70 forms a concave shape, one side of which is open. The cover 70 is disposed so that the opening faces leftward. The cover 70 has a cover bottom wall 71, which forms a bottom surface at the bottom of the recess, and cover peripheral walls 72, which respectively rise in the form of upright (perpendicular) walls from the peripheral edges of the cover bottom wall 71. The cover peripheral walls 72 extend in the leftward direction. The cover peripheral walls 72 comprise a cover upper wall 72*a*, a cover lower wall 72*b*, a cover front wall 72*c*, and a cover rear wall 72*d*. As shown in FIGS. 6 and 8, in parts of the upright ends of the cover upper wall 72*a*, the cover front wall 72*c*, and the cover rear wall 72*d*, welding recesses 73 are formed on cover facing-surfaces 72*e* that face the case facing-surfaces 62*e* in the left-right direction. The welding recesses 73 correspond (are complementary) to the welding protrusions 64 on the case 60. The cover 70 has guide pieces 74 extending, in the upright direction, beyond the ends of the cover front wall 72*c* and the cover rear wall 72*d*. The guide pieces 74 extend towards the case 60, beyond the cover facing-surfaces 72*e*.

As shown in FIGS. 5 and 6, the circuit board 50 is a plate-shaped member extending in the up-down direction. The circuit board 50 is disposed with the surfaces thereof respectively facing in the left-right directions. The circuit board 50 has two board recesses 50*d*, which are recessed to match the case protrusions 65 of the case 60. Contacts 56, 57, and 58 for the switches, as well as the FETs 52, the capacitor 53, a first lead (wires) 55*a*, a second lead (wires) 55*b*, and a third lead (wires) 55*c*, are provided on a main surface 50*a* of the circuit board 50. Six FETs 52 are provided on the main surface 50*a* of the circuit board 50. The FETs 52 include first FETs 52*a* and second FETs 52*b*. The first FETs 52*a* and the second FETs 52*b* are disposed aligned in the front-rear direction. The first FETs 52*a* are configured (oriented) to be elongated in the up-down direction. Three first FETs 52*a* are provided aligned in the up-down direction. The second FETs 52*b* are configured to be elongated (oriented) in the front-rear direction. The second FETs 52*b* are provided along the circuit board 50 in a state inclined by approximately 90 degrees relative to the first FETs 52*a*. Three second FETs 52*b* are provided aligned (parallel) in the up-down direction. The microcomputer 51 is provided on the back surface 50*b* of the circuit board 50. The microcomputer 51 is provided below the FETs 52 in the up-down direction. The capacitor 53 has a capacitance of, for example, 1000 µF. The capacitance of the capacitor 53 may be in the range of 100 µF to 1200 µF, preferably 500 µF to 1200 µF, and more preferably 1000 µF to 1200 µF.

As shown in FIGS. 5 and 6, the first lead 55*a* is connected at the upper end of the circuit board 50. The first lead 55*a* is formed from (comprises) five conductive wires. The first lead 55*a* is connected to the sensor board 4 (see FIG. 2). The first lead 55*a* receives detection signals from the sensor board 4. The second lead 55*b* is connected at the upper end of the circuit board 50. The second lead 55*b* is formed from (comprises) two conductive wires. The second lead 55*b* is connected to the lamp 5 (see FIG. 2). The second lead 55*b* supplies operating current to the lamp 5. The third lead 55*c* is connected at the central part, in the up-down direction, of the circuit board. The third lead 55*c* is formed from (comprises) three conductive wires. The third lead 55*c* is connected to the brushless motor 1*c* (see FIG. 2). The third lead 55*c* is engaged with an engagement part 76 formed on the outer peripheral surface of the cover 70.

Figure 4:
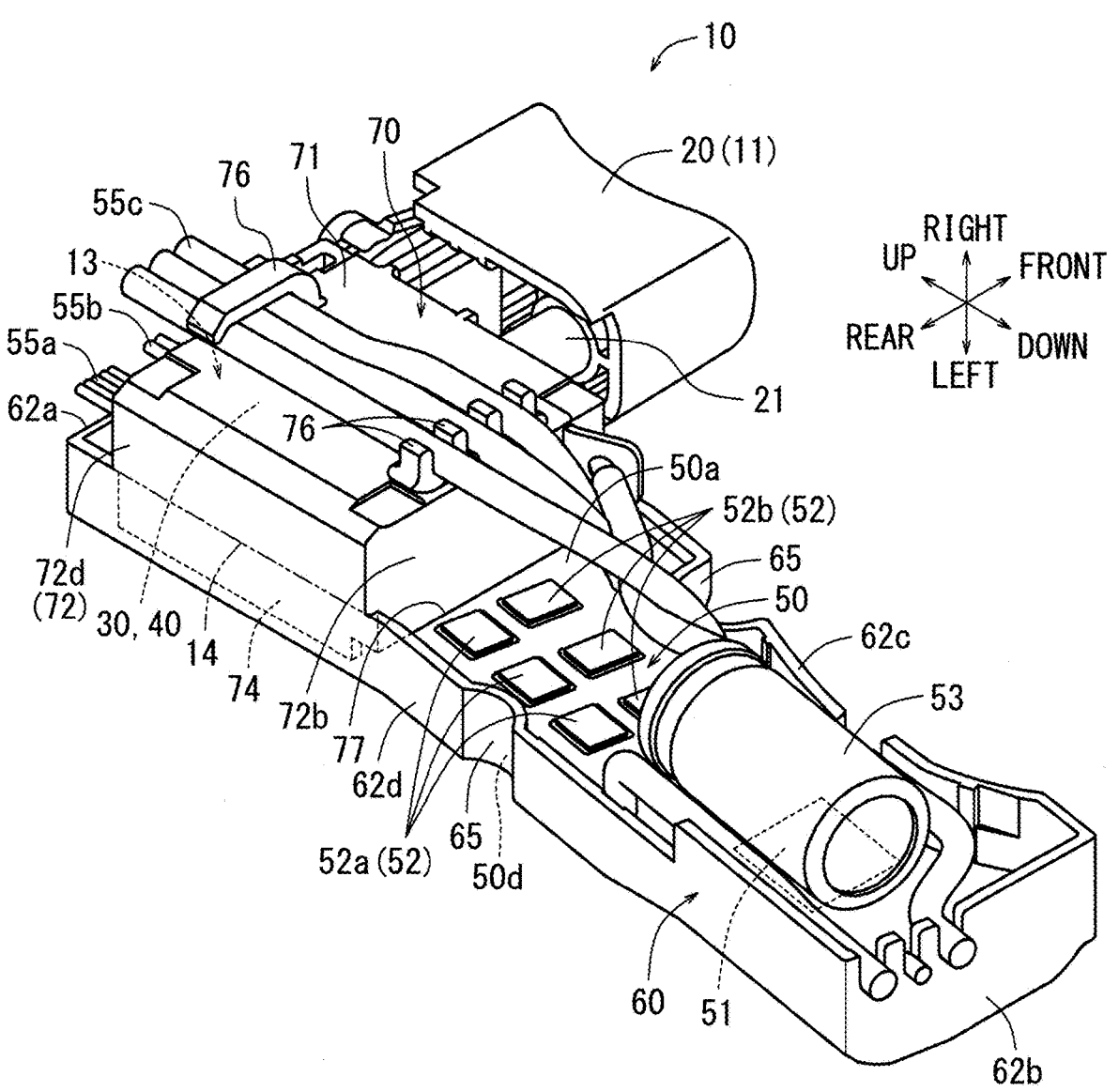
FIG. 4 is a perspective view of the control module.

As shown in FIG. 4, the circuit board 50 is housed in the interior of the case 60. The case protrusions 65 of the case 60 are respectively inserted into the board recesses 50*d* of the circuit board 50. The circuit board 50 is thereby positioned with respect to the case 60. The back surface 50*b* of the circuit board 50 (see FIG. 6) makes contact with the rib 63 of the case 60 (see FIG. 5). The circuit board 50 and the rib 63 are sealed to each other without a gap by a bonding agent (adhesive). In the state in which the circuit board 50 is housed at the interior of the case 60, the upper region thereof is covered by the cover 70. The FETs 52 and the microcomputer 51 are disposed in regions outside of the enclosed space 13. It is, therefore, possible to efficiently dissipate heat from the FETs 52 and the microcomputer 51.

Figure 7:
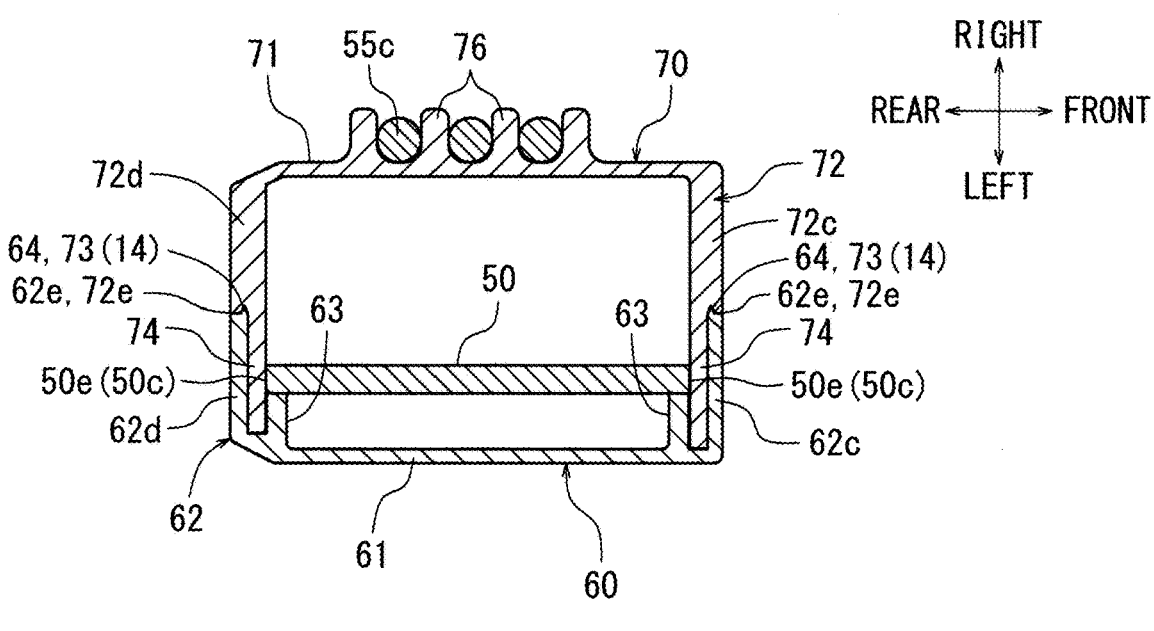
FIG. 7 is a cross-sectional view along the line VII-VII in FIG. 3.

As shown in FIG. 7, the cover 70 is overlaid on the case 60 so that the welding protrusions 64 of the case 60 are respectively inserted into the welding recesses 73 thereof. The ends of the cover upper wall 72*a* and the case upper wall 62*a*, the ends of the cover front wall 72*c* and the case front wall 62*c*, and the ends of the cover rear wall 72*d* and the case rear wall 62*d* are thereby each butted against each other. Then, the welding protrusions 64 and the welding recesses 73 that are fitted into each other are integrally welded (materially bonded) by ultrasonic welding (bonded parts 14). The case facing-surfaces 62*e* and the cover facing-surfaces 72*e* are thereby welded to each other. That is to say, the case peripheral walls 62 and the base parts of the guide pieces 74 of the cover 70 are welded to each other. The cover 70 is thereby integrally assembled (joined) to the case 60.

As shown in FIG. 4, in the assembly described above, the cover lower wall 72*b* projects into the interior of the case 60 along the case front wall 62*c* and the case rear wall 62*d*. The end of the projecting cover lower wall 72*b* makes contact with the main surface 50*a* of the circuit board 50. The cover lower wall 72*b* and the circuit board 50 are bonded to each other with a bonding agent (sealed part 77), such as an adhesive. The cover lower wall 72*b* and the circuit board 50 are thereby sealed to each other without a gap. Therefore, after the lower region of the case 60 is encapsulated with the resin molding 6 (see FIG. 3), it is possible to curtail (block) entry of the resin molding 6 into the enclosed space 13 from the cover lower wall 72*b* side.

As shown in FIG. 7, the guide pieces 74 of the cover 70 are respectively inserted into gaps between the circuit board 50 and the case front wall 62*c* and the case rear wall 62*d*. The cover 70 is thereby stably supported with respect to the case 60 and the circuit board 50. As shown in FIGS. 5 and 6, the side surface 50*c* of the circuit board 50 has recessed notched parts 50*e* matching the respective guide pieces 74. By inserting each of the guide pieces 74 into the respective notched parts 50*e*, the guide pieces 74 can curtail rattling of the circuit board 50 in the up-down direction. As is also seen in FIG. 7, the two guide pieces 74 respectively fit between the ribs 63, which support the circuit board 50, and the case front wall 62*c* and the case rear wall 62*d*. The guide pieces 74 are thus located within the enclosed space 13.

As shown in FIGS. 5 and 6, upon being assembled to each other, the cover 70 and the case 60 form a front through hole 15, which passes through in the front-rear direction. The front through hole 15 opens in a circular shape spanning between the case front wall 62*c* and the cover front wall 72*c*. In addition, upon being assembled to each other, the cover 70 and the case 60 form an upper through hole 16, which passes through in the up-down direction. The upper through hole 16 opens in a circular shape spanning between the case upper wall 62*a* and the cover upper wall 72*a*. As shown in FIG. 8, a rod 21 extending from the trigger 20 is inserted into, and extends through, the front through hole 15. The change bracket 42 is inserted into, and extends through, the upper through hole 16.

As shown in FIG. 8, the trigger 20 has the rod 21, which extends through the front through hole 15 into the interior of the cover 70, and a switch holder 22 provided at the tip of the rod 21. The rod 21 and the switch holder 22 slide in the front-rear direction in conjunction with the pulling manipulation of the trigger 20. Anti-dust grease 24 is provided between the rod 21 and the front through hole 15. The grease 24 can curtail ingress of dust and the like into the enclosed space 13 through the front through hole 15. It is noted that, together with the grease 24, a seal such as an O-ring may be provided between the rod 21 and the front through hole 15.

As shown in FIG. 8, a spring 75 biasing the switch holder 22 in the frontward direction is mounted on the interior side of the cover 70. The spring 75 biases the trigger 20 in the frontward direction. A control brush 32 for the control switch 31 and a variable speed brush 34 for the variable speed switch 33 are provided on the switch holder 22. The control brush 32 and the variable speed brush 34 are disposed aligned (parallel) in the up-down direction. In addition, in the interior of the cover 70, a movable sheet metal piece 35*a*, which is bent to be substantially L-shaped, and power supply contacts 35*e*, which are provided on the rear of the movable sheet metal piece 35*a* and on an inner surface of the cover 70, are provided to constitute the power switch 35.

In addition, a change holder 43, which is coupled to the change bracket 42, is provided in the interior of the cover 70. The change holder 43 can slide in the front-rear direction in the interior of the cover 70. The change holder 43 slides in the front-rear direction in conjunction with the rotation of the change bracket 42 accompanying pushing movements of the change buttons 41 (see FIG. 2). A change brush 44 for the change switch 40 is provided in the change holder 43. The change bracket 42 extends through the upper through hole 16 into the interior of the cover 70. Anti-dust grease 46 is provided between the change bracket 42 and the upper through hole 16. The grease 46 can curtail ingress of dust and the like into the enclosed space 13 through the upper through hole 16. It is noted that, together with the grease 46, a seal such as an O-ring may be provided between the change bracket 42 and the upper through hole 16.

Figure 10:
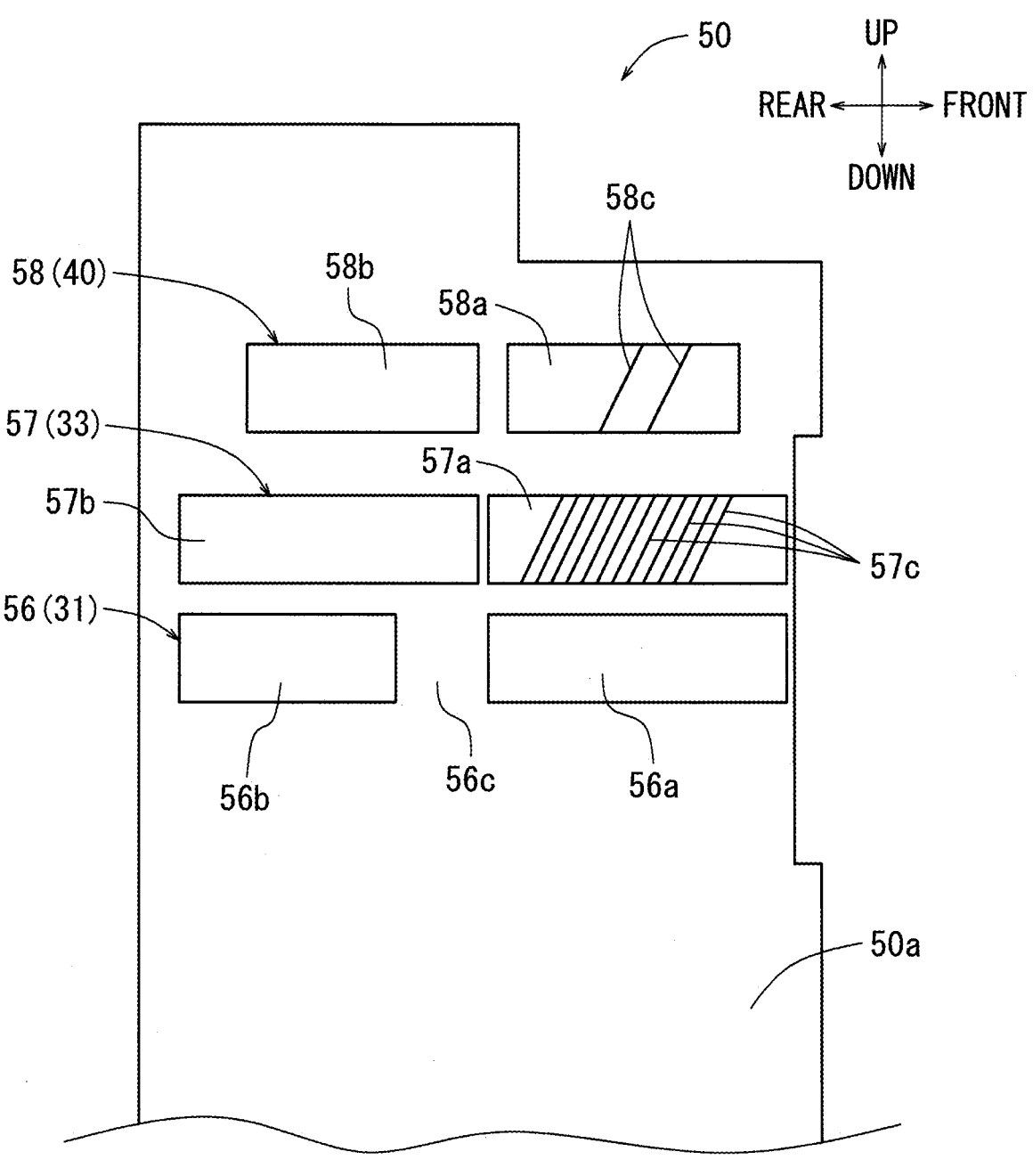
FIG. 10 is an enlarged view of the upper region of the circuit board.

As shown in FIG. 10, control contacts 56 for the control switch 31, variable speed contacts 57 for the variable speed switch 33, and change contacts 58 for the change switch 40 are provided on the upper part of the main surface 50*a* of the circuit board 50. The control contacts 56 include a front control contact 56*a* and a rear control contact 56*b*. A gap 56*c* is formed (provided) between the front control contact 56*a* and the rear control contact 56*b*. The variable speed contacts 57 include a front variable speed contact 57*a* and a rear variable speed contact 57*b*. A plurality of second slits 57*c* are formed (defined) in the front variable speed contact 57*a*. The change contacts 58 include a front change contact 58*a* and a rear change contact 58*b*. Two third slits 58*c* are formed (defined) in the front change contact 58*a*.

Figure 9:
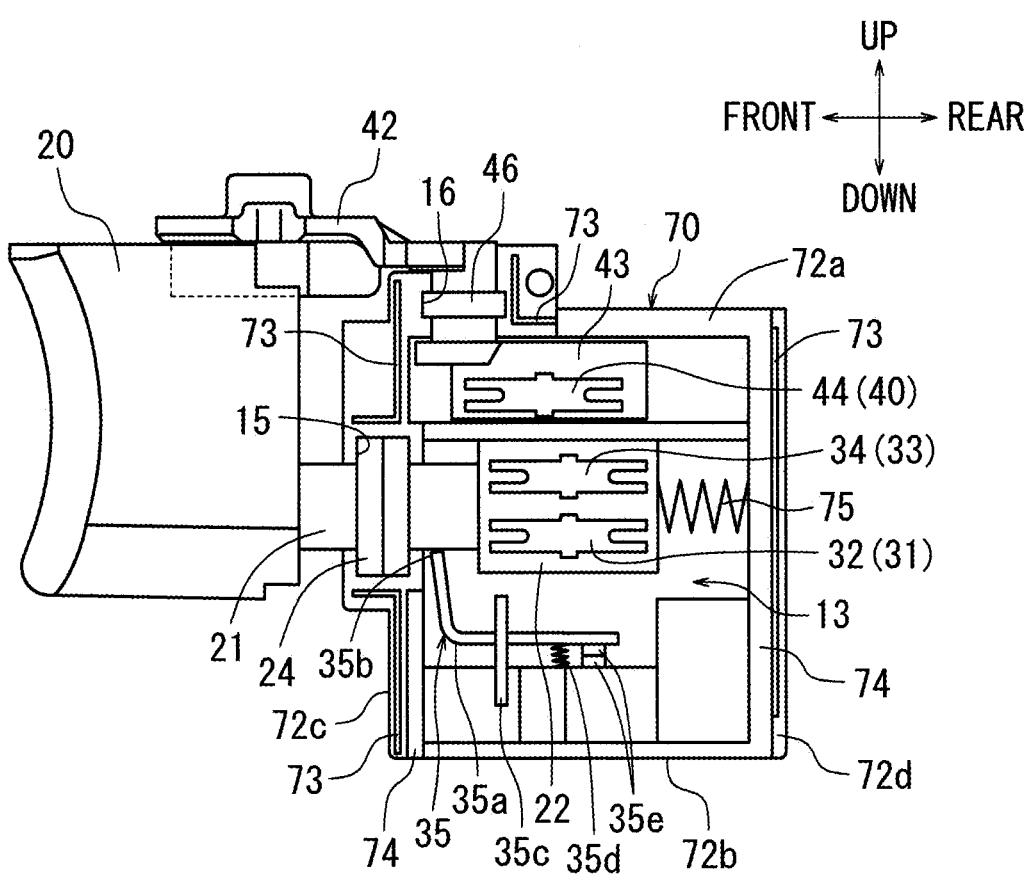
FIG. 9 is a view corresponding to FIG. 8, showing the state in which the trigger has been pulled.

As shown in FIGS. 9 and 10, when the power supply contacts 35*e* of the power switch 35 are in contact with each other, the battery 3, the control module 10, and the brushless motor 1*c* are electrically connected. When the control contacts 56 of the control switch 31 are connected to each other via the control brush 32, the microcomputer 51 is started. Then, the microcomputer 51 recognizes pulling manipulation of the trigger 20 and lights the lamp 5. In addition, when to the variable speed contacts 57 of the variable speed switch 33 are connected to each other via the variable speed brush 34, the magnitude of the voltage value input to the microcomputer 51 is determined.

As shown in FIGS. 8 through 10, in an initial state, in which the trigger 20 is not yet pulled, the state is such that the power supply contacts 35*e* do not to make contact with each other. In the initial state, the control contacts 56 are not connected to each other. In the initial state, the variable speed contacts 57 are connected to each other and a relatively large voltage value is input to the microcomputer 51. Pulling of the trigger 20 first causes the power supply contacts 35*e* to come into contact with each other. Then, by continuing the pulling, the control contacts 56 become connected to each other. With further pulling, the variable speed contacts 57 switch the connection so as to gradually decrease the voltage value that is input to the microcomputer 51. The microcomputer 51 outputs operating signals to the FETs 52 to energize (drive) the brushless motor 1*c* when the input voltage value falls below a predetermined value.

As shown in FIGS. 8 and 9, the movable sheet metal piece 35*a* of the power switch 35 is supported so as to be rotatable in the up-down direction about a supporting sheet metal piece 35*c*, serving as a pivot. The rear of the movable sheet metal piece 35*a* is pulled downward by a tension spring 35*d*. That is to say, the movable sheet metal piece 35*a* is biased in a direction in which the power supply contacts 35*e* make contact with each other. However, in the initial state, owing to the spring force of the spring 75, the switch holder 22 presses the engagement part 35*b* at the front of the movable sheet metal piece 35*a* frontward. The rear of the movable sheet metal piece 35*a* is thereby rotated upward against the pulling force of the tension spring 35*d*. The power supply contacts 35*e* are therefore held in a non-contact state. When the trigger 20 is pulled, the switch holder 22 moves rearward. The rear of the movable sheet metal piece 35*a* thereby rotates downward. The power supply contacts 35*e* therefore make contact with each other. The power switch 35 is thus switched to the ON state. As a result, the battery 3, the control module 10, and the brushless motor 1*c* are electrically connected, as described above.

As shown in FIGS. 8 and 9, because the cover 70 is overlaid on the upper portion of the circuit board 50, the control brush 32 of the control switch 31 is disposed so as to face the control contacts 56. In the initial state in which the user has not yet pulled the trigger 20, the front end of the control brush 32 contacts the front control contact 56*a*. The rear end of the control brush 32 contacts a portion of the board in the gap 56*c* between the control contacts 56. In this state, the control contacts 56 are not connected, and the control switch 31 is in the OFF state. This OFF state is maintained by the spring force of the spring 75. Then, when the user pulls the trigger 20, the switch holder 22 moves rearward. The control brush 32 thereby also moves rearward. As a result, the rear end of the control brush 32 makes contact with the rear control contact 56*b*. The control contacts 56 are thereby connected and the control switch 31 is in the ON state. The microcomputer 51 is started due to the ON state of the control switch 31. The microcomputer 51 recognizes the pulling manipulation of the trigger 20, and lights the lamp 5.

In addition, the variable speed brush 34 of the variable speed switch 33 is disposed so as to face the variable speed contacts 57. In the initial state in which the user has not yet pulled the trigger 20, the front end of the variable speed brush 34 contacts the front part of the front variable speed contact 57*a*. The rear end of the variable speed brush 34 contacts the rear variable speed contact 57*b*. In this initial connection state, a relatively large voltage value is input to the microcomputer 51. This initial connection state is maintained by the spring force of the spring 75. Then, when the user pulls the trigger 20, the switch holder 22 and variable speed brush 34 move rearward. The front end of the variable speed brush 34 is thereby caused to move sequentially past the second slits 57*c* of the front variable speed contact 57*a* toward the rear of the front variable speed contact 57*a*. The more the front end of the variable speed brush 34 moves rearward, the lower the voltage value input to the microcomputer 51. When the voltage value falls below a predetermined value, the microcomputer 51 outputs signals to rotationally drive the brushless motor 1*c*. Then, the microcomputer 51 performs operations so as to increase the rotational speed of the brushless motor 1*c* in accordance with the decrease in voltage values. The rotational speed of the brushless motor 1*c* is thereby increased with greater pulling of the trigger 20 by the user. It is noted that the voltage value input to the microcomputer 51 may also be controlled so as to be relatively low in the initial state and to increase as the front end of the variable speed brush 34 moves rearward. In such an embodiment, the microcomputer 51 may output signals to rotationally drive the brushless motor 1*c* when the input voltage value exceeds a predetermined value and to increase the rotational speed as the voltage value increases.

In addition, the change brush 44 of the change switch 40 is disposed so as to face the change contacts 58. When the change holder 43 is disposed at the front of the cover 70, the front end of the change brush 44 makes contact with the front of the front change contact 58*a*. The rear end of the change brush 44 makes contact with the rear change contact 58*b*. In this state, the microcomputer 51 determines that the change switch 40 has been placed in the forward rotation position. Consequently, when transmitting an operating signal to the brushless motor 1*c*, the microcomputer 51 causes the rotor of the brushless motor 1*c* to rotate in the forward direction, e.g., clockwise. When the change holder 43 moves to the central part of the cover 70, the front end of the change brush 44 passes the front third slit 58*c* and makes contact with the central part of the front change contact 58*a*. In this state, the microcomputer 51 determines that the change switch 40 has been placed in the neutral position. In that state, the microcomputer 51 does not send an operating signal to the brushless motor 1*c* even if the input voltage value is below the predetermined value. Therefore, the tool body 1 does not operate, even if the user pulls the trigger 20. It is thereby possible to prevent the tool body 1 from operating when not intended to do so by the user. When the change holder 43 moves to the rear of the cover 70, the front end of the change brush 44 passes the rear third slit 58*c* and makes contact with the rear of the front change contact 58*a*. In this state, the microcomputer 51 determines that the change switch 40 has been placed in the reverse rotation position. Consequently, when transmitting an operating signal to the brushless motor 1*c*, the microcomputer 51 causes the rotor of the brushless motor 1*c* to rotate in the reverse direction, e.g., counterclockwise.

As shown in FIG. 1 and as described above, the control module 10 includes the box-shaped case 60, one side of which is open, and the circuit board 50 housed in the case 60. As shown in FIG. 4, the microcomputer 51 and the FETs 52 (field effect transistors), which are used to control the brushless motor 1c of the power tool 100, are mounted on the circuit board 50. The trigger 20 is movably coupled to the case 60. The movable switches 30, which are mechanically linked to the movement of the trigger 20, are connected to the circuit board 50. The cover 70 is partially overlaid on the opening of the case 60. The cover 70 covers a portion of the circuit board 50 and, in particular, covers the movable switches 30. The control module 10 has bonded parts 14, which weld or bond the cover 70 and the case 60 together. The case 60, cover 70 and bonded parts 14 form an enclosed space 13, which encloses the movable switches 30.

In the bonded parts 14, at least portions of the cover 70 and the case 60 are melted or otherwise fused so as to be materially bonded (e.g., welded) to each other. Gaps between the cover 70 and the case 60 are therefore filled by the bonded parts 14. The enclosed space 13 is formed between the cover 70 and the case 60. The enclosed space 13 has better dustproofing and waterproofing than, for example, a closed space in which the cover 70 and the case 60 are connected to each other by a snap fit. The movable switches 30 are protected by the enclosed space 13. Thus, poor conduction in the movable switches 30 due to dust or water is unlikely to occur.

As shown in FIG. 4, the microcomputer 51 and the FET 52 are provided on the circuit board 50 in positions clear (outside) of the enclosed space 13. Therefore, when the microcomputer 51 and the FET 52 generate heat, the microcomputer 51 and the FET 52 can effectively dissipate the heat.

As shown in FIG. 2, the operation (starting) and stopping of the brushless motor 1c is switched in response to the movement of the movable switches 30, which are mechanically linked to the trigger 20. Thus, the operation and stopping of the brushless motor 1c is switched by manipulating the trigger 20.

As shown in FIG. 2, the movable switches 30 include a power switch 35 and a variable speed switch 33. The power switch 35 electrically connects and disconnects the brushless motor 1c and the battery 3. The variable speed switch 33 controls the output of the brushless motor 1c according to the amount of movement of the trigger 20. Thus, the power switch 35 and the variable speed switch 33 are each controllable by manipulating the trigger 20. The movable switches 30 may further include a control switch 31 that controls the operation of the microcomputer 51. The microcomputer 51 may, for example, recognize input from the control switch 31 and light the lamp 5 of the power tool 100. The lamp 5 can therefore be reliably lit upon manipulation of the trigger 20.

As shown in FIG. 7, the case 60 has the case bottom wall 61 and the case peripheral walls 62, which extend upright (perpendicular) from the peripheral edges of the case bottom wall 61. The cover 70 has the cover bottom wall 71 and the cover peripheral walls 72, which extend upright (perpendicular) from the peripheral edges of the cover bottom wall 71. The bonded parts 14 weld or otherwise materially bond case facing-surfaces 62e of the case peripheral walls 62 and the cover facing-surfaces 72e of the cover peripheral walls 72, which face each other in the directions of extension. Thus, the mutually-facing surfaces of the case peripheral walls 62 and the cover peripheral walls 72 are welded or bonded together.

As shown in FIG. 7, the cover 70 has the guide pieces 74, which extend toward the case 60 beyond the cover facing-surfaces 72e of the cover peripheral walls 72 and extend so as to pass between the case peripheral walls 62 and the side surfaces 50c of the circuit board 50. The guide pieces 74 fit between the circuit board 50 and the case peripheral walls 62. Thus, the cover 70 is held stably with respect to the circuit board 50 and the case 60 by the guide pieces 74. Furthermore, the bonded parts 14 may weld or otherwise materially bond the ends of the guide pieces 74 to the case 60.

As shown in FIGS. 3 and 4, the cover 70 is provided at one end side (a first end portion) of the case 60. The cover lower wall 72b of the cover peripheral walls 72, which is located at an intermediate location of the case 60, extends into the interior of the case 60. This cover lower wall 72b of the cover 70 and the circuit board 50 are bonded by the sealed part 77. The other end side (a second end portion) of the case 60, which is not covered by the cover 70, is covered (potted, encapsulated) by the resin molding 6. Thus, the electronic components on the other end side (in the second end portion) of the case 60 are protected from dust or water by the resin molding 6. The resin molding 6 is prevented (blocked) from entering the enclosed space 13 by the cover peripheral walls 72 and the sealed part 77. Thus, contact failure in the movable switches 30 due to the presence of resin molding 6 in the enclosed space 13 can be avoided.

As shown in FIG. 8, the manipulatable member is the trigger 20 that is manipulated by pulling. The trigger 20 has the rod 21, which passes between the case 60 and the cover 70. The rod 21 is physically connected to the movable switches 30 in the enclosed space 13 and is movable in the axial direction of the rod 21. Thus, when the case 60 and the cover 70 are joined together, the rod 21 is interposed between the case 60 and the cover 70. The rod 21 slides in the axial direction, relative to the case 60 and the cover 70.

As shown in FIG. 8, anti-dust grease 24 is provided between the rod 21 and the case 60, and between the rod 21 and the cover 70. This grease can curtail ingress of dust into the interior of the cover 70. In addition, the change switch 40 is provided in the enclosed space 13, and is configured to change the direction of rotation of the rotor of the brushless motor 1c. The change bracket 42 passes between the case 60 and the cover 70, and is physically connected (linked) to the change switch 40. Anti-dust grease 46 is provided between the change bracket 42 and the case 60, as well as between the change bracket 42 and the cover 70.

As shown in FIG. 8, the spring 75 biases the manipulatable member. The spring 75 is disposed in the enclosed space 13. Thus, difficulties in deforming the spring 75 resulting from dust or water are curtailed by the enclosed space 13.

As shown in FIG. 4, the movable switches 30 are disposed on one end side (an upper region) of the circuit board 50. The microcomputer 51 is mounted on the other end side (a lower region) of the circuit board 50 so as to be farther away from the movable switches 30 than the FETs 52.

As shown in FIG. 1, the case 60 has the case protrusions 65, which project toward the circuit board 50, so as to be clear of (avoid) the screws 2a provided in the main body of the power tool 100. As shown in FIGS. 5 and 6, the circuit board 50 has board recesses 50d, into which the case protrusions 65 are respectively inserted. The circuit board 50 is positioned relative to the case 60 by the board recesses 50d. Thus, the case protrusions 65 of the case 60 perform both the function of clearing (avoiding) the screws 2a and the function of fixedly positioning the circuit board 50 within the case 60.

As shown in FIG. 4, the capacitor 53, which temporarily stores charge to be applied to the brushless motor 1*c*, is provided on the circuit board 50. The capacitor 53 is disposed at a position outside of the enclosed space 13. The capacitor 53 is a relatively large component. Therefore, it is possible to avoid having to increase the size of the cover 70 to accommodate the capacitor 53 within the enclosed space 13. The capacitor 53 has a capacitance of, for example, 100 μF to 1200 μF, preferably 500 μF to 1200 μF, and more preferably 1000 μF to 1200 μF.

As shown in FIGS. 3 and 4, the FETs 52 are provided outside of the cover 70 (i.e. outside of the enclosed space 13), and on the main surface 50*a* of the circuit board 50, which faces the opening of the case 60. The FETs 52 are covered by the resin molding 6. Thus, because they are outside the cover 70, it is easy for the FETs 52 to dissipate heat. Furthermore, the FETs 52 are protected from dust or water by the resin molding 6.

Figure 11:
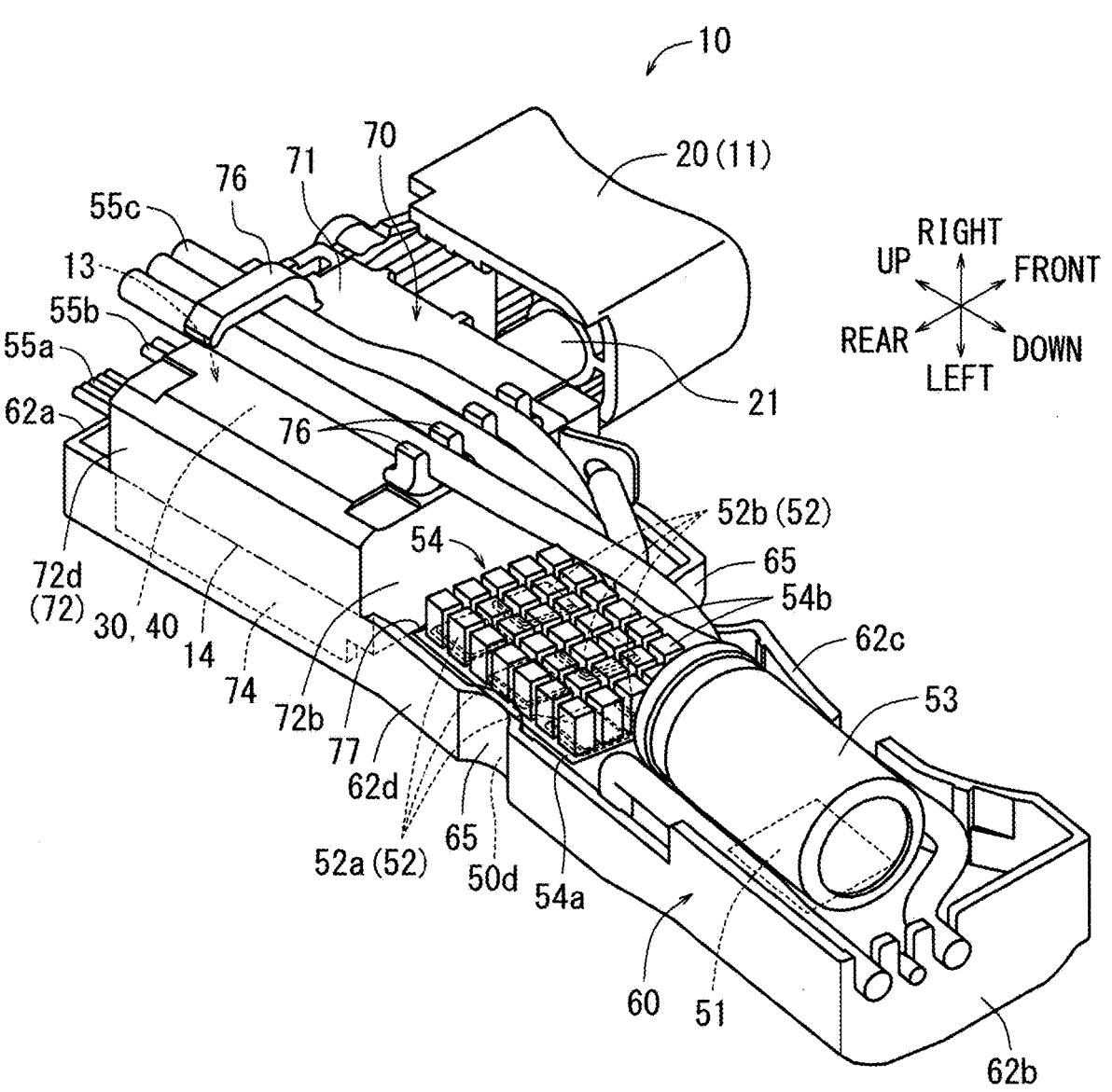
FIG. 11 is a perspective view corresponding to FIG. 4 showing the state in which the FETs are covered with a heat sink.

As shown in FIGS. 4 and 11, the FETs 52 include the first FETs 52*a* and the second FETs 52*b*. The second FETs 52*b* are provided along the circuit board 50 in a state inclined by 80 to 100 degrees relative to the first FETs 52*a*. A heat sink 54 is overlaid so as to span (cover) the first FETs 52*a* and the second FETs 52*b*. Thus, the heat sink 54 can more efficiently dissipate heat from the first FETs 52*a* and the second FETs 52*b*.

As shown in FIG. 1, the power tool 100 has the grip 2 extending from the tool body 1. The control module 10 is disposed within the grip 2. The cover 70 and the trigger 20 are disposed at one end side of the control module 10. Because both the grip 2 and the control module 10 are elongated structures, the control module 10 has a rational component arrangement corresponding to the grip 2.

As shown in FIG. 2, the power tool 100 has the sensor board 4 provided with the sensors 4*a*, which detect the rotational speed of the brushless motor 1*c*. The first lead 55*a* extends from the sensor board 4 to a position on the circuit board 50 outside of the enclosed space 13. Thus, one end of the first lead 55*a* can easily be provided on the circuit board 50.

As shown in FIG. 2, the power tool 100 has the lamp 5. The second lead 55*b* extends from the lamp 5 to a position on the circuit board 50 outside of the enclosed space 13. Thus, one end of the second lead 55*b* can easily be provided on the circuit board 50.

Various changes can be made to the exemplary embodiment described above. For example, although the exemplary power tool according to the present teachings was illustrated as a driver drill, Alternatively, the control module of the present disclosure can be similarly applied to, e.g., impact drivers, impact wrenches, chain saws, hammer drills, reciprocating saws, grinders, polishers, portable band saws, circular saws, sliding circular saws, cutters, planes, earth auger drills, screwdrivers, and multi-tools (oscillating multi-tools or oscillating saws), and the like. Shared use of batteries is possible for all the types of power tools mentioned above.

The control module may be configured to have two or more circuit boards. The manipulatable member may be configured to have only a rod without having a trigger. The manipulatable member may be a paddle switch. In addition to ultrasonic welding, the bonded parts may also have a configuration in which the case and cover are bonded to each other using bonding agent (adhesive). The manipulatable member may be configured to move in the up-down direction.

The cover may be configured to be directly welded or otherwise materially bonded to a portion of the main surface of the circuit board, without being welded or bonded to the case. In such an embodiment, the case may be configured to house the circuit board, and may also be welded or bonded to the back surface of the circuit board so as to cover a portion of the back surface of the circuit board. In addition, the control module may also be configured so as not to have a case. In such an embodiment, for example, the circuit board to which the cover has been bonded is placed in a temporary holding case, and the portions other than the enclosed space are covered with a resin molding. By subsequently removing the case, the circuit board can be appropriately covered with a resin molding. If it does not have a case, the control module can be reduced in size by an amount corresponding to the thickness of the case.

The case may be configured to open to the left. The cover may be configured to be overlaid, not only on the upper region of the case, but also on a lower region or a central region in the up-down direction. The cover may be configured such that only the ends of the cover front wall and the cover rear wall are welded or bonded to the ends of the case peripheral walls. In such an embodiment, the cover may be configured such that the cover upper wall and the cover lower wall extend into the interior of the case and bonding to the circuit board is performed by a sealed part. A configuration in which the welding protrusions are formed on the case was illustrated. Alternatively, welding protrusions may be formed on the cover. In conjunction therewith, welding recesses may be formed in the case.

Figure 12:
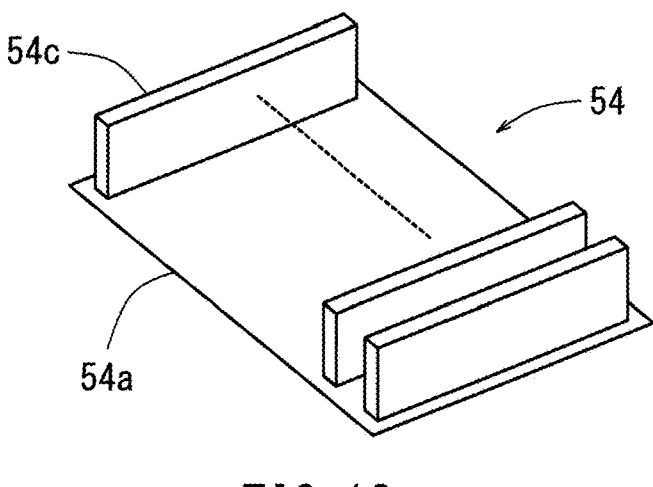
FIG. 12 is a perspective view showing the heat sink in another exemplary embodiment.
Figure 13:
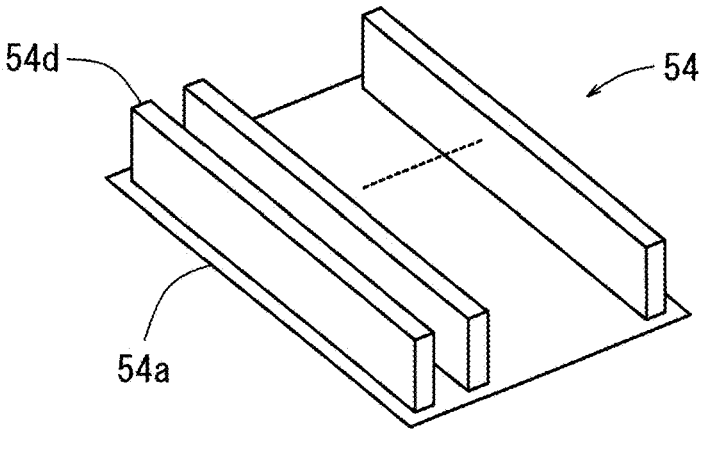
FIG. 13 is a perspective view showing the heat sink in yet another exemplary embodiment.
Figure 14:
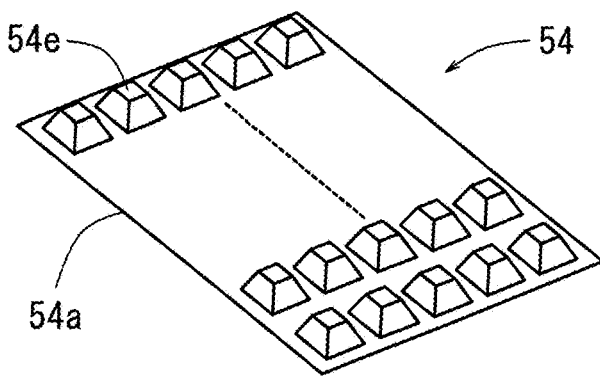
FIG. 14 is a perspective view showing the heat sink in yet another exemplary embodiment.

The microcomputer may be provided on the main surface of the circuit board. The microcomputer may be provided above the FETs in the up-down direction. The FETs were illustrated in a configuration which six FETs were provided on the circuit board. Alternatively, any number thereof may be provided, so long as this is a multiple of 3, such as 3 or 12. A heat sink may be mounted on the FETs. For example, as shown in FIG. 11, a heat sink 54 overlying the FETs 52 may be mounted on the circuit board 50. The heat sink 54 has a bottom plate 54*a* extending along the circuit board 50 and a plurality of fins 54*b* projecting rightward from the bottom plate 54*a*. Each of the fins 54*b* forms a rectangular prism shape. The heat sink 54 is mounted such that a bottom plate 54*a* thereof covers all of the FETs 52. The heat sink 54 is mounted on the FETs 52 with an insulator such as a bonding agent or heat dissipating sheet therebetween. By providing the heat sink 54, the FET 52 can dissipate heat more efficiently. It is noted that, as shown in FIGS. 12-14, the heat sink 54 may have fins in various different shapes. For example, these may be thin plate-like fins 54*c*, 54*d*, or fins 54*e* projecting in truncated square pyramids, or the like.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved power tools.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

EXPLANATION OF THE REFERENCE NUMERALS

100: power tool
200: tool accessory
1: tool body
1a: housing
1b: drive axis
1c: brushless motor
1d: drive mechanism
1e: reduction gear train
1g: mode changing ring
1h: chuck
2: grip
2a: screw
2b: projection
2c: battery mounting part
3: battery
4: sensor board
4a: sensor
5: lamp
6: resin molding
10: control module (control module for a power tool)
11: manipulatable part
12: control part
13: enclosed space
14: bonded part
15: front through hole
16: upper through hole
20: trigger (manipulatable member)
21: rod
22: switch holder
24: grease (anti-dust grease)
30: movable switches
31: control switch
32: control brush
33: variable speed switch
34: variable speed brush
35: power switch
35a: movable sheet metal piece
35b: engagement part
35c: supporting sheet metal piece
35d: tension spring
35e: power supply contact
40: change switch
41: change button
42: change bracket
43: change holder
44: change brush
46: grease (anti-dust grease)
50: circuit board
50a: main surface
50b: back surface 50c: side surface
50d: board recess
50e: notched part
51: microcomputer
52: FET
52a: first FET
52b: second FET
53: capacitor
54: heat sink
54a: bottom plate
54b: fin
54c: fin
54d: fin
54e: fin
55: lead
55a: first lead
55b: second lead
55c: third lead
56: control contact
56a: front control contact
56b: rear control contact
56c: gap
57: variable speed contact
57a: front variable speed contact
57b: rear variable speed contact
57c: second slit
58: change contact
58a: front change contact
58b: rear change contact
58c: third slit
60: case
61: case bottom wall
62: case peripheral wall
62a: case upper wall
62b: case lower wall
62c: case front wall
62d: case rear wall
62e: case facing-surface
63: rib
64: welding protrusion
65: case protrusion
70: cover
71: cover bottom wall
72: cover peripheral wall
72a: cover upper wall
72b: cover lower wall (wall part)
72c: cover front wall
72d: cover rear wall
72e: cover facing-surface
73: welding recess
74: guide piece
75: spring
76: engagement part
77: sealed part

The invention claimed is:

1. A control module for a power tool, including:
a box-shaped case, one side of which is open;
a circuit board housed in the case;
a microcomputer and field effect transistors (FETs), which are mounted on the circuit board and are configured to control a brushless motor of the power tool;
a manipulatable member, which is movable relative to the case;
one or more movable switches electrically connected to the circuit board and mechanically linked to movement of the manipulatable member;

a cover, which partially overlays the case opening so as to cover a portion of the circuit board and so as to cover the movable switch(es); and bonded parts that form an enclosed space, which encloses the movable switch(es), by welding or otherwise materially bonding the cover to the case;

wherein:

the case has a case bottom wall and case peripheral walls extending perpendicular from peripheral edges of the case bottom wall;

the cover has a cover bottom wall and cover peripheral walls extending perpendicular from peripheral edges of the cover bottom wall;

the bonded parts weld or otherwise materially bond, to each other, case facing-surfaces of the case peripheral wall and cover facing-surfaces of the cover peripheral wall, which face each other in their directions of extension;

the cover has guide pieces, which extend toward the case beyond the cover facing-surfaces of the cover peripheral walls and extend so as to pass between the case peripheral walls and side surfaces of the circuit board, the guide pieces fitting between the circuit board and the case peripheral walls; and the bonded parts weld or otherwise materially bond extending ends of the guide pieces to the case.

2. The control module for a power tool according to claim 1, wherein:

the microcomputer and the FETs are provided on the circuit board at positions outside of the enclosed space.

3. The control module for a power tool according to claim 1, wherein:

the microcomputer is configured to switch the brushless motor between operating and stopping in response to movement of the movable switch(es), linked to the manipulatable member.

4. The control module for a power tool according to claim 3, wherein:

the one or more movable switches include: a power switch, which electrically connects and disconnects the brushless motor and the battery; and a variable speed switch, which controls the output of the brushless motor in accordance with the amount by which the manipulatable member is moved.

5. The control module for a power tool according to claim 1, wherein:

the cover is provided on a first end portion of the case;

a wall part of the cover peripheral walls, which is located at an intermediate portion of the case, extends into the interior of the case and is bonded to the circuit board by a sealed part; and a second end portion of the case that is not covered by the cover is covered by a resin molding.

6. The control module for a power tool according to claim 1, wherein:

the manipulatable member is a trigger that is manipulated by pulling;

the trigger has a rod, which passes between the case and the cover; and the rod is physically connected to the movable switch(es) in the enclosed space and is movable in the axial direction of the rod.

7. The control module for a power tool according to claim 6, wherein:

anti-dust grease is provided between the rod and the case and between the rod and the cover.

8. The control module for a power tool according to claim 1, further including:

a spring that biases the manipulatable member, wherein the spring is disposed in the enclosed space.

9. The control module for a power tool according to claim 1, wherein:

the movable switch(es) is/are disposed on a first end portion of circuit board; and the microcomputer is mounted on a second end portion of the circuit board so as to be farther away from the movable switch(es) than the FETs.

10. The control module for a power tool according to claim 1, wherein:

the case has case protrusions that project toward the circuit board so as to avoid screws provided in the main body of the power tool; and the circuit board has board recesses into which the case protrusions are respectively inserted, such that the case protrusions and the board recesses position the circuit board relative to the case.

11. The control module for a power tool according to claim 1, further comprising:

a capacitor, which temporarily stores charge to be supplied to the brushless motor, provided on the circuit board, the capacitor being located outside of the enclosed space.

12. The control module for a power tool according to claim 11, wherein:

the capacitor has a capacitance of 100 μF to 1200 μF.

13. The control module for a power tool according to claim 1, wherein:

the FETs are located outside of the enclosed space, and on a main surface of the circuit board, which faces the opening of the case, and the FETs are covered by a resin molding.

14. The control module for a power tool according to claim 1, wherein:

the FETs include first FETs and second FETs provided along the circuit board, such that an elongation direction of the second FETs is inclined by 80 to 100 degrees relative to an elongation direction of the first FETs; and a heat sink is overlaid so as to span the first FETs and the second FETs.

15. A power tool, including:

a grip extending from a tool body, wherein:

the control module according to claim 1 is disposed within the grip; and the cover and the manipulatable member are disposed at one end side of the control module.

16. The power tool according to claim 15, further including:

a sensor board having at least one sensor configured to detect the rotational speed of the brushless motor; and a first lead, which extends from the sensor board to a position on the circuit board outside of the enclosed space.

17. The power tool according to claim 15, further including:

a lamp; and a second lead, which extends from the lamp to a position on the circuit board outside of the enclosed space.

18. The control module for a power tool according to claim 1, wherein the guide pieces are located within the enclosed space.

19. The control module for a power tool according to claim 18, wherein:

first and second ribs on the case support the circuit board;

the circuit board has a first notch on a first side surface and a second notch on a second side surface;

a first one of the guide pieces is fitted within the first notch of the circuit board and is also fitted between the first rib and a first one of the case peripheral walls; and a second one of the guide pieces is fitted within the second notch of the circuit board and is also fitted between the second rib and a second one of the case peripheral walls.

20. A control module for a power tool, including:

a box-shaped case, one side of which is open;

a circuit board housed in the case;

a microcomputer and field effect transistors (FETs), which are mounted on the circuit board and are configured to control a brushless motor of the power tool;

a manipulatable member, which is movable relative to the case;

one or more movable switches electrically connected to the circuit board and mechanically linked to movement of the manipulatable member;

a cover, which partially overlays the case opening so as to cover a portion of the circuit board and so as to cover the movable switch(es); and bonded parts that form an enclosed space, which encloses the movable switch(es), by welding or otherwise materially bonding the cover to the case;

wherein:

the FETs include first FETs and second FETs provided along the circuit board, such that an elongation direction of the second FETs is inclined by 80 to 100 degrees relative to an elongation direction of the first FETs; and a heat sink is overlaid so as to span the first FETs and the second FETs.

* * * * *